Sept. 9, 1947.  E. M. BORG  2,427,186
LIQUID EXTRACTION PRESS
Filed May 16, 1942  5 Sheets-Sheet 1

INVENTOR.
EDWARD M. BORG
BY Cook & Robinson
ATTORNEYS

INVENTOR.
EDWARD M. BORG

Sept. 9, 1947.  E. M. BORG  2,427,186
LIQUID EXTRACTION PRESS
Filed May 16, 1942    5 Sheets-Sheet 5

INVENTOR.
EDWARD M. BORG
ATTORNEYS

Patented Sept. 9, 1947

2,427,186

UNITED STATES PATENT OFFICE 2,427,186

LIQUID EXTRACTION PRESS

Edward M. Borg, Seattle, Wash.

Application May 16, 1942, Serial No. 443,209

13 Claims. (Cl. 100—39)

This invention relates to improvements in canning machinery, and it has reference more particularly to a machine designed for the drawing out and extraction of liquid content from fish, or a similar product, after the product has been packed in cans or containers, and partially prepared, but prior to the placing of the ends on the cans for final sealing.

More specifically stated, the present invention resides in the novel features of a machine designed to accomplish the expeditious, mechanical extraction or displacing of liquid content from the fish or product being canned, after it has been given a certain preparatory treatment in the cans and in accordance with that particular step of liquid extraction in the method of canning fish which has been disclosed and claimed in my copending application for patent filed on February 17, 1942, under Serial No. 431,255, which has issued as Patent No. 2,411,188, dated November 19, 1946.

It is the principal object of this invention to provide a practical, novel and comparatively simple machine to be used in the practising of a canning operation or method, for the quick and effective extraction or displacement of an undesirable liquid content from the prepared product while in the cans, but prior to sealing the cans.

It is also an object of the invention to provide a machine for the purpose above stated, which is of the progressive, continuously charged type, and wherein displacing of liquid content is effected by pressure applied in a novel manner.

Other objects of the invention reside in the provision of means for utilizing vacuum in conjunction with the novel application of pressure, to expedite the extraction of liquid content from the fish product.

Still other objects of the invention reside in the details of construction and combination of parts and in their mode of operation, as will hereinafter be fully described.

Other objects reside in novel details of construction of the machine for the collecting and discharging of the liquid content as collected from the cans.

In accomplishing these and other objects of the invention, I have provided the improved details of construction, the preferred forms of which are illustrated in the accompanying drawings, wherein—

In accordance with the stated objects of the invention embodying that particular method of canning fish, and the like, that has been set forth in my previously mentioned Patent No. 2,411,188, the cans filled with the fish product, and with top ends unclosed, are conveyed submerged through a hot water bath for a predetermined period of time to effect a desired tenderization of the meat, by reason of the separation of or opening up of cell structure of the meat and tissues, whereby the extraction of liquid content is more easily accomplished. From this tenderizing operation, which is referred to by those who practice the method, as "dipping," the cans of fish are conveyed through a cooling bath and ultimately are brought to the present machine for the extraction or displacement of liquid content.

Figure 1:
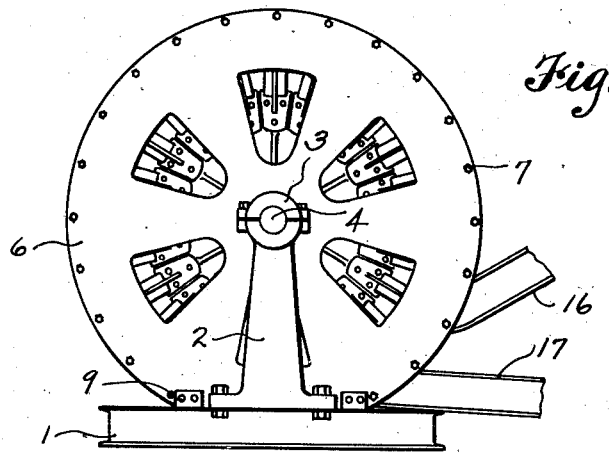
Fig. 1 is a side view, in reduced scale, of a machine embodied by this invention.
Figure 2:
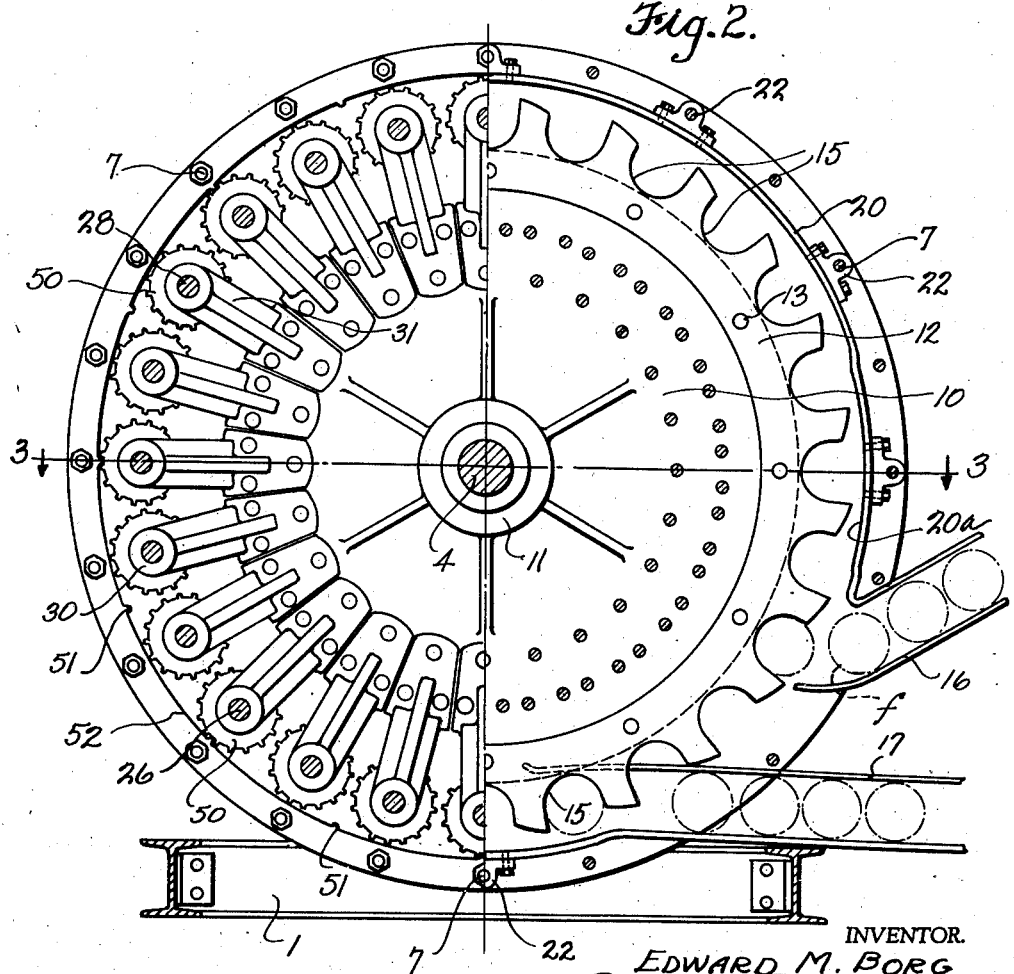
Fig. 2 is an enlarged cross sectional view in an irregular vertical plane, along the line 2—2 in Fig. 3.

Explanatory to the mode of use of the machine as disclosed in Figs. 1 and 2, it will be mentioned that when the prepared cans of fish, from the dipping operation, arrive at the present machine for the extraction of liquid, the meat is quite solidly packed in the cans which are full practically to the top edge, and is sufficiently solid that it will not fall out even though the cans should be inverted, and thus it is possible and is practical to deliver the cans to, and to feed them into the machine by gravity, rolling them down an inclined chute for automatic pick up by the machine turret. Also, this gravity delivery method may be employed for the discharge of the cans from the machine.

Referring more in detail to the drawings—

Figure 3:
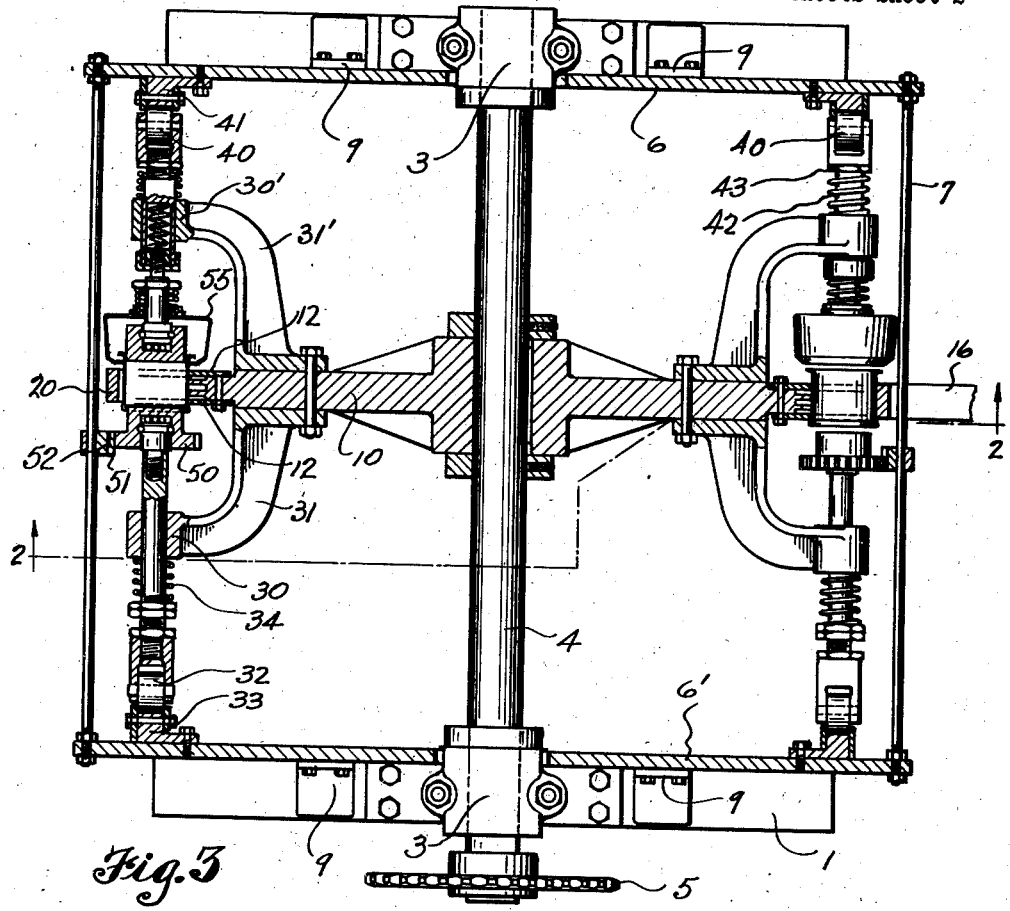
Fig. 3 is a horizontal sectional view, on line 3—3 in Fig. 2.

In one of its present, preferred forms of construction, as illustrated in Figs. 1 to 3, the machine employs the vertical type of turret, and there is a supporting frame having a horizontal base structure 1 upon which a pair of spaced, upright brackets or standards 2—2 are fixed. At their upper ends, these standards are equipped with bearing boxes 3—3 in which the main drive shaft 4 of the machine is revolubly mounted. This shaft, as seen in Fig. 3, is horizontally disposed and is equipped at one end with a driving gear or sprocket wheel 5 through which connection is made with a motor or other driving means of suitable kind.

Supported from the opposite ends of the base frame structure, are disk-like end plates 6 and 6', joined together across the machine by a plurality of horizontal tie rods 7. These end plates, 6 and 6' are disposed in parallel, vertical planes, and are located at the inside of the standards, and are fixed solidly to the base structure by brackets 9 as shown in Fig. 1.

Keyed on the drive shaft 4, centrally between the end plates 6—6', is a turret disk or wheel 10 having a mounting hub portion 11 which receives the shaft. Fixed to the opposite faces of the wheel 10, concentric and about the periphery thereof, are paired annular disks 12—12, held by bolts 13 extended through the parts. These disks are formed at regular intervals of angular spacing, with outwardly opening pockets 15, transversely aligned for the reception and holding of the cans for the liquid extraction operation. As observed in Figs. 2 and 3, the cans from which the liquid is to be displaced, are cylindrical, and the pockets 15 are so disposed in the disks and are of such size as to snugly receive the cans therein. The opposite end portions of the cans, when the latter are seated in the pockets, extend somewhat beyond the faces of the disks, as it noted in Fig. 6.

Leading downwardly to the turret, and opening to one side thereof, is a feed chute 16 in which the cans, with product therein, are caused to roll from a source of supply for automatic delivery directly from the chute into the pockets of the turret as they successively pass in registration with the open end of the chute. Also, there is another chute 17, below the chute 16, into which cans are discharged from the machine, and along which they will roll by gravity to a place of discharge.

In order that the cans, designated by reference character f, as received within the pockets of the turret may be properly retained against displacement while the turret revolves, I provide a retaining band or housing 20 about the turret. This band is cylindrically formed, lesser in width than the length of the cans, and is disposed coaxially of and about the turret, and has fixed supporting connection with certain of the tie rods 7, as by means of the brackets 22, seen in Fig. 2. The turret, in the device shown in Fig. 2, rotates in a counter-clockwise direction, and it is shown therein that immediately after a can has entered a turret pocket, it is carried beneath the adjacent portion of the retaining band 20. This initial part of the band, through an arc of about 30°, is inwardly set to cause it to bear quite firmly against the can, thus to hold the can firmly seated, during which period of time the abutment pad or table for that particular can, and the corresponding extractor plunger, respectively, are brought into pressure exerting contact with the bottom end of the can and the can contents, as presently will be fully described. Then, the band 20 is outwardly relieved, so that the can will be only loosely held and may be axially rotated in the seat for a purpose presently apparent. The inwardly offset portion of the band 20 is designated at 20a in Fig. 2.

In the machine, as illustrated in Fig. 2, I have shown the turret as being equipped with twenty-four can pockets, and axially alined with each pocket, at one side of the turret, is an abutment or pressure sustaining pad or table 25 mounted rotatably on the end of a supporting shaft 26. At the other side of the turret, and axially alined with each pocket, is a pressure head or plunger 27 supported on a mounting shaft 28 which, in turn, is supported from and in effect is an extension of an actuating shaft 29.

Figure 6:
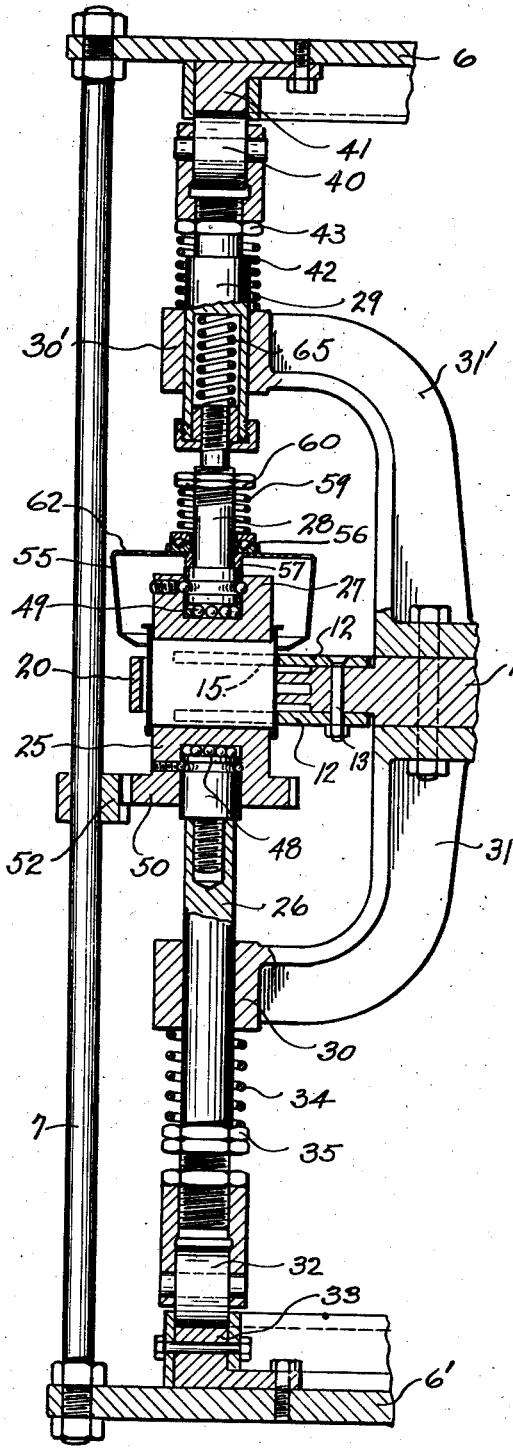
Fig. 6 is an enlarged, sectional detail of one of the pressure applying or extractor units of the machine.

The shafts 26 and 29, as alined with each pocket in the turret, are supported slidably in bearings 30—30' that are formed at the ends of brackets 31 and 31' that are fixed to the opposite sides of the turret disk or wheel 10, as seen best in Fig. 3, and it will be understood further, by reference to Fig. 6, that each of the shafts 26 is equipped at its outer end with a cam follower roller 32 adapted to travel in rolling contact upon a circular cam track 33 that is bolted or otherwise fixed to the end plate 6' concentrically about the turret driving shaft 4.

Figure 4:
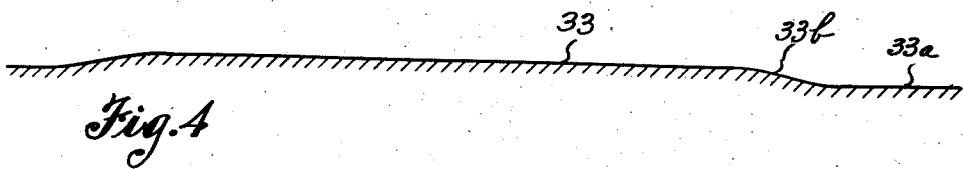
Fig. 4 is a development of the cam whereby the pressure heads or extracting plungers of the machine are actuated.

A coiled spring 34 is disposed about each shaft 26 to bear, at one end, against the shaft mounting bearing and to bear at its other end against a pressure adjusting nut 35 threaded on the shaft to keep the roller in close contact with the cam. The cam track 33, as shown in Fig. 4, has a relief portion 33a which is so located as to extend from the discharge point to slightly beyond the intake angle of rotation, permitting the abutment pad during this angular interval of travel, to recede from the can end. This is to facilitate discharge of the can and the reception of a new can. Also, there is a return rise, as at 33b, which will cause the shifting of the table into tight contact with the end of a can just received into a pocket, at which position it remains to counteract the pressure forces of the plunger until the can ultimately arrives at the discharge point.

The plunger actuating shafts 29 likewise are reciprocally contained in their mounting bearings, and at their outer ends are equipped each with a cam follower roller 40 adapted to engage with a circular cam track 41 fixed on end plate 6. A coiled spring 42 surrounds each shaft 29 to bear against its mounting bearing and against a pressure adjusting nut 43 threaded on the shaft to keep the cam roller in contact with the cam, and thus urge the plunger to its retracted position.

Figure 5:
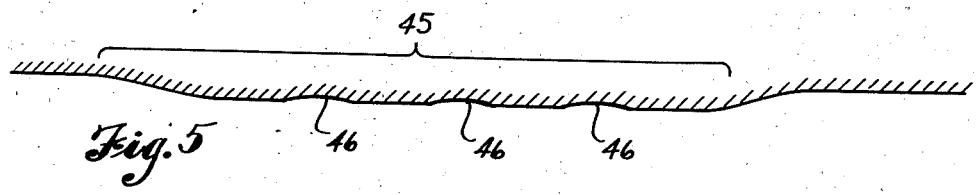
Fig. 5 is a development of the cam whereby the pressure sustaining pads or tables are actuated against and from the closed ends of the cans while in the machine.

The cam track 41, as seen in Fig. 5, is relieved along that length thereof that spans the discharge and intake angle, to permit necessary retraction of the plunger to give clearance for reception of a can in the turret pocket; then the cam has a rather long and gradual rise, as indicated within the bracket 45 in Fig. 5, which causes the plunger to be moved slowly inward and against the contents of the can to effect the desired pressure for displacement and extraction of the liquid content, without any undesirable splashing out of material. At selected intervals, the cam has short reliefs as at 46, designed to permit slight and momentary release of pressure on the product and thus to effect a sort of pumping action that expedites the extraction of the liquid from the meat under pressure.

It is desirable, and is necessary in order to obtain best results in this type of machine where the cans lie horizontally, that after pressure has once been applied against the contents of a can, and liquid has started to flow therefrom, that the can should be rotated on the pocket, and opposite to the direction of the turret so that the point from which liquid initially starts to flow shall remain at the bottom side of the can.

Without provision for this reverse turning of the can, it will be understood that each can would be caused to rotate once about its axis with each rotation of the turret. Therefore, to accomplish this reverse turning of cans, each pressure pad and each plunger, or piston, is rotatably mounted on its supporting shaft so that, even while pressure for the extraction of liquid is being applied and sustained and while the turret is turning in one direction, the can may be turned in the opposite direction at such rate as to maintain an unchanging point of discharge of liquid from the open end of the can.

As noted in Fig. 6, it will be observed that the pad 25 is rotatably fitted to the end of shaft 26 and that anti-friction bearings 48 of suitable kind are inserted in the mounting to take the thrust or pressure that is applied. Likewise, the pressure applying plungers 27 are mounted rotatably on the shafts 28 and anti-friction bearings 49 are so applied as to take the pressure.

In order that the filled cases f may be turned in a direction opposite to and in accordance with rotation of the turret, each pad 25 has a gear wheel 50 fixed thereto, as seen in Figs. 2 and 6, and the teeth of each gear are adapted to engage with teeth 51 located at spaced intervals, corresponding to the angular spacing of the pockets, on the gear band 52 encircling the turret as seen in Fig. 2. Thus, with the rotation of the turret, the gears are intermittently actuated to rotate the pressure pads and cans in the opposite direction. Thus, when liquid, under pressure of the inwardly moving plunger, starts to flow from the mouth of a can, its flow will not be retarded, or the liquid retained in the flange or rim of the can about the plunger by reason of any turning of the can.

It is also desirable that the liquid content thus displaced from the cans should not be permitted to flow or fall down from one can to a lower can. Therefore, I have provided each pressure plunger with a cylindrical enclosing hood or drum 55. Each hood is open at its inner end and closed at its outer end and has a mounting hub 57 fitted to the corresponding shaft 28 and carrying a thrust ball bearing 56. A coiled spring 59 applied about the shaft 28 bears against the bearing and against a pressure holding nut 60 on the shaft, to urge the open end of the drum toward the turret flange 12. When, incident to the rotation of the turret, a plunger 27 is inwardly actuated by cam 41 from a retracted position to which it has previously been moved for discharge of a can from the turret to a position into a can end to exert pressure against the contents of a can to displace liquid content, the open end of the drum receives the open outer end of the can, as in Fig. 6. Therefore all liquid displaced from the can is caught in the drum. The drum is somewhat flared toward its base end, and thus the collected liquid is caused to run to that end where slots or outlets as at 62 are provided, from which it may drip to the base of the machine and flow out through a trough provided for this purpose. When the plunger 27 is retracted, it retracts the drum with it to an extent sufficient to clear the can and flange and permit the can to roll from the turret pocket when it reaches the chute 27.

By reference to Fig. 6, it will be understood that the outer end of shaft 28 is telescopically contained in shaft 29, which is tubular, and a coiled spring 65 that is enclosed in shaft 29 presses outwardly against the end of shaft 28 to thereby effect a yielding pressure to be applied by the piston. This spring incidentally takes up any unevenness in the filling of cans.

Figure 7:
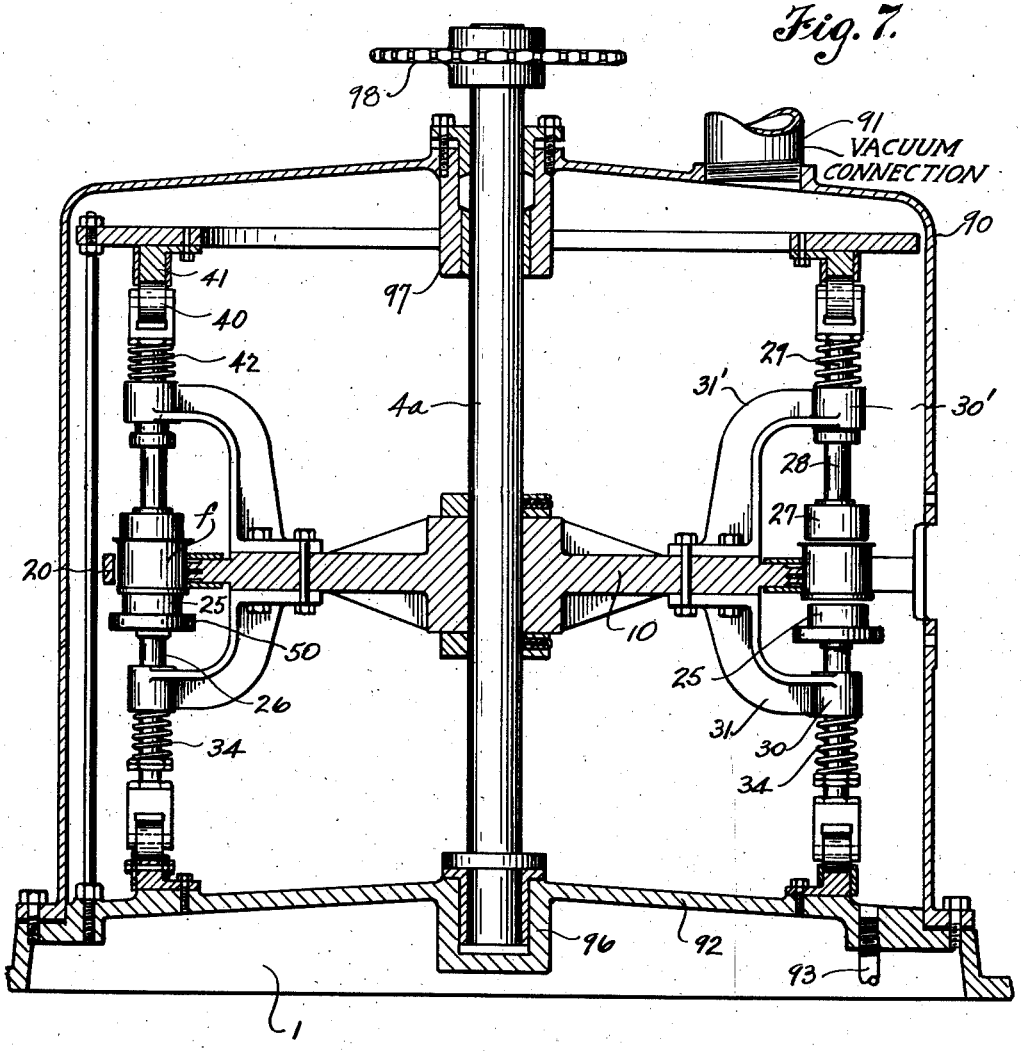
Fig. 7 is a vertical section of a horizontal turret type of machine, utilizing vacuum in the extracting operation.
Figure 8:
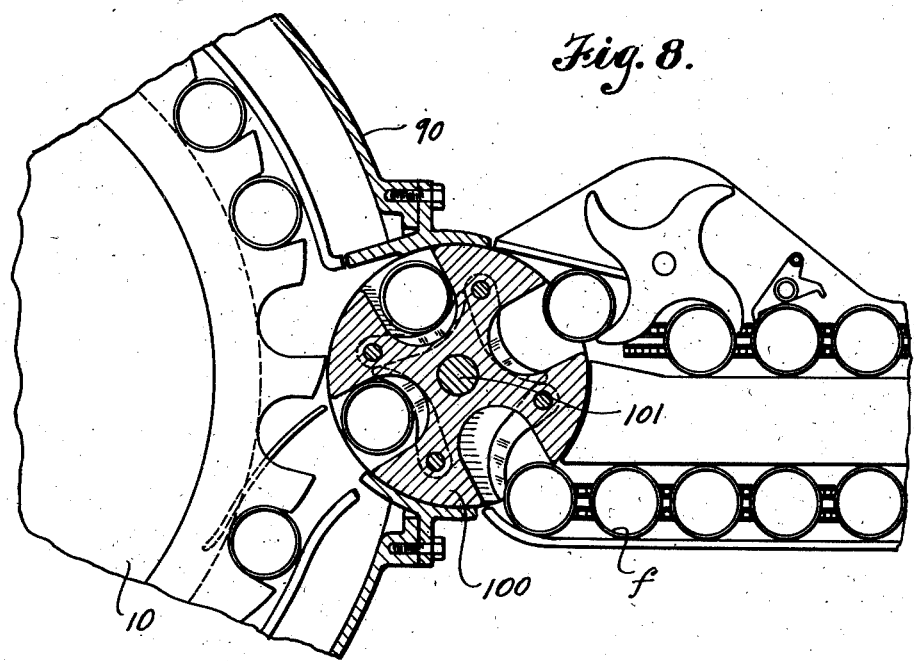
Fig. 8 is an enlarged cross sectional view of a valve mechanism suitable for the delivery of cans into and from the housing of the machine shown in Fig. 7.

In Figs. 7 and 8, I have illustrated a machine which is of the horizontal type of turret and which is equipped for the extraction of liquid by mechanical pressure and vacuum. In these views, I have shown the turret and extraction devices enclosed in an air-tight housing 90 to which a vacuum pipe 91 is connected. The bottom wall 92 of the housing is sloped to drain to an outlet pipe 93 which may be connected to a pump, not shown, for withdrawal of liquid.

The turret is mounted by a central vertical shaft 4a carried in bearings 96 and 97 and a sprocket wheel 98 is fixed on the upper end of the shaft to drive it.

Cans are delivered into and from the housing by a rotary valve 100 and this may be driven by its shaft 101 in synchronism and proper timing with the turret. The valve mechanism in this instance, may be like that of U. S. Patent No. 1,758,369 or any other suitable rotary valve as used in connection with vacuum sealing machines now well known in the art.

By the use of machines of the kind described, cans may be handled expeditiously, quickly and the liquid content readily removed or extracted as desired.

The details of construction of such machines may be varied to suit desired capacities, different types of cans and extraction either by pressure alone or in conjunction with vacuum.

Having thus described my invention, what I claim as new therein and desire to secure by Letters Patent is:

1. A machine of the character described comprising a rotary turret equipped with holding means for the reception and conveyance of filled, open ended cans along a path of travel, a pressure table corresponding to each can holding means of the turret, for engaging the end of a can held by the corresponding holding means, a pressure plunger corresponding to each holding means, devices for causing the actuation of the pressure plungers into the open ends of the cans as they are conveyed for the compression of their contents, and means for causing the pressure tables to move to retracted positions for reception of cans into the holding means and for moving them against the can ends while pressure is being applied by the plungers against the contents of the cans.

2. A machine of the character described comprising a rotary turret equipped with holding means for the reception and conveyance of filled, open ended cans along a path of travel, a pressure table corresponding to each can holding means mounted on the turret, a pressure plunger corresponding to each can holding means mounted on the turret in opposed relationship to the corresponding pressure table, means for moving said tables and plungers to retracted positions for reception of the cans between them, and cam devices fixed in the machine at opposite sides of the turret for actuating the said tables against the can ends to sustain pressure by the plungers and the plungers into their open ends of the cans for the compression of their contents.

3. A machine of the character described comprising a frame structure, a turret rotatably mounted therein, means for rotating the turret; said turret having peripheral pockets for the reception and conveyance of cans along a path of travel from entrance to discharge points of the machine, brackets fixed to opposite sides of the turret in alinement with said pockets, shafts mounted by said brackets for endwise movement and axially alined with the cans as contained in the pockets, abutment tables mounted on the shafts at one side of the turret, pressure plungers mounted on the shafts at the other side, cam followers at the outer ends of said shafts, and cams fixed in the frame at opposite sides of the turret and engaged by said followers whereby the said tables will be actuated from retracted positions to engage the can ends, and said plungers will be actuated into the open ends of the cans to compress their contents as said cans move along said path of travel.

4. A machine of the character described comprising a rotary turret equipped with pockets for the reception and conveyance of filled, open ended cans along a path of travel, an abutment table carried on the turret corresponding to each pocket, a pressure plunger on the turret corresponding to each pocket, cams for the actuation of the tables and plungers from retracted positions for delivery of cans between them into the pockets and for moving them against the can ends and can contents, respectively, for the compression of the latter, and relief spots in the cam which actuates the pressure plungers whereby the pressure on the can as applied thereby will be momentarily reduced during the pressure period.

5. A machine of the character described comprising a rotary turret mounted on a horizontal axis and having peripheral pockets into which filled, open ended cylindrical cans may be received and conveyed while supported therein axially parallel with the turret axis, plungers operable from retracted positions into the open ends of the cans to compress their contents for the displacement of liquid content, and means for causing the cans to be rotated on their axes opposite to and in accordance with the rotation of the turret.

6. A machine of the character described comprising a rotary turret mounted on a horizontal axis, and having peripheral pockets for the reception and conveyance of filled open ended cans along an extended arc of travel; said pockets being designed to support the cans horizontally and for rotation therein, an abutment table on the turret at one side thereof corresponding to each pocket, pressure plungers on the turret, at the side opposite the said tables and corresponding to each pocket, means for actuating the tables and plungers from retracted positions, against the can ends and into the open ends thereof for the compression of the contents; said tables and plungers being axially alined with the cans and each being axially rotatable, and means for causing axial rotation of the tables opposite to and in accordance with rotation of the turret, to thereby rotate the cans accordingly.

7. A machine of the character described comprising a rotary turret mounted on a horizontal axis and formed with peripheral outwardly opening pockets in which cylindrical, filled, open ended cans may be loosely received for conveyance along an extended arc of travel, a housing surrounding the turret for retaining the cans in the pockets, abutment tables mounted on the turret at one side thereof and axially alined with the can pockets, pressure plungers mounted on the other side of the turret and axially alined with the pockets; said tables and said plungers being axially rotatable and movable from retracted positions to engage the can ends and to effect pressure against the cans' contents, respectively, means for effecting said movements of the tables and plungers, a gear wheel mounted by each table and said housing having teeth thereon to engage teeth of said gears to effect rotation of the tables and cans opposite to and in accordance with rotation of the turret.

8. A machine of the character described comprising a rotary turret mounted on a horizontal axis, and having peripheral pockets for the reception of filled open ended cans and their conveyance therein through an extended arc of travel, while held axially parallel with the turret axis, an abutment on the turret corresponding to each pocket to seat the can thereagainst, a plunger on the turret corresponding to each pocket, means for actuating the plungers from retracted position free of the cans into the open ends of the cans to compress their contents, and a drum applied about each plunger to move therewith when so actuated to receive the open end portion of the can thereinto and to receive liquid displaced from the can.

9. A machine as in claim 8 wherein each drum is of outwardly flared cylindrical form to cause the received liquid to flow to its outer end, and each drum has drainage openings at its outer end.

10. A machine of the character described comprising a rotary turret mounted to turn on a horizontal axis, and formed about its periphery with outwardly opening pockets for the reception and conveyance of filled, cylindrical, open ended cans therein, while held axially parallel with the turret axis, brackets fixed to the turret at opposite sides thereof in alinement with each pocket, shafts slidably carried by said brackets, in axial alinement with the pockets, abutment tables rotatably mounted by the shafts at one side of the turret, pressure plungers rotatably mounted on the shafts at the other side of the turret, cams for actuating the shafts from retracted positions to extended positions to cause the tables to engage the can ends and the plungers to enter the open ends to compress the cans' contents, means for rotating the tables to cause rotation of the cans opposite to and in accordance with rotation of the turret, drums on the plunger mounting shafts movable therewith and disposed to receive the open ends of the cans therein when pressure is applied by the plungers and to catch the extracted liquid therein.

11. In a machine of the character described, means for supporting a filled, open ended can, a plunger movable against the contents of the can through its open end for compression of its contents to effect extraction of liquid content therefrom, and means for actuating the plunger; said plunger having a plurality of longitudinally channeled spikes on its pressure face for easy escape of fluid matter from the can's contents when under pressure.

12. A machine of the character described, comprising a rotary turret equipped with pockets for the reception and conveyance therein of filled open ended cans along a path of travel, pressure plungers, corresponding to each can position in the turret and of a size to fit closely in said cans and adapted to permit the exit of extracted liquid past the plungers, a stationary cam and means associated with each plunger and movable with the turret to follow along said cam; said cam being designed for actuating said plungers from retracted positions into the open ends of the corresponding cans for the compression of their contents with intermittent periods of release of pressure and an incident creation of slight suction on the product.

13. In an extracting machine equipped for holding an open can of material for extraction of liquid from the material; a plunger arranged to enter said can to compress the material for liquid extraction and of a size to fit closely in the can and adapted to permit the exit of extracted liquid past the plunger, means for relatively moving the plunger and can to cause the material to be subjected to extracting pressure through an extended time interval and means for periodically causing the extracting pressure to be momentarily relieved and suction produced on the product.

EDWARD M. BORG.

REFERENCES CITED

The following references are of record in the file of this patent:

UNITED STATES PATENTS

| Number | Name | Date |
|---|---|---|
| 472,618 | Frey et al. | Apr. 12, 1892 |
| 599,856 | Middlekauff | Mar. 1, 1898 |
| 1,764,158 | Edwards | June 17, 1930 |
| 1,957,883 | Grayson | May 8, 1934 |
| 2,270,007 | McKinnis | Jan. 13, 1942 |
| 1,483,951 | Price | Feb. 19, 1924 |
| 1,491,971 | Rickard | Apr. 29, 1924 |
| 1,760,205 | Muller | May 27, 1930 |
| 1,891,830 | Nicholson | Dec. 20, 1932 |
| 2,059,432 | Bently | Nov. 3, 1936 |
| 2,115,335 | Keck | Apr. 26, 1938 |
| 2,113,978 | Bell | Apr. 12, 1938 |
| 1,046,715 | Arnold | Dec. 10, 1912 |

Disclaimer 2,427,186.—*Edward M. Borg*, Seattle, Wash. LIQUID EXTRACTION PRESS. Patent dated Sept. 9, 1947. Disclaimer filed Feb. 12, 1951, by the inventor.
Hereby enters this disclaimer to claim 11 of said patent.
[*Official Gazette March 13, 1951.*]